United States Patent [19]

Murakami et al.

[11] 4,343,659

[45] Aug. 10, 1982

[54] PROCESS FOR PRODUCING COPPER BARRIER TYPE, NUCLEAR FUEL CLADDING

[75] Inventors: Kanji Murakami; Motoyo Wajima; Tetsuo Ishikawa, all of Hitachi, Japan

[73] Assignee: Hitachi, Ltd., Tokyo, Japan

[21] Appl. No.: 200,439

[22] Filed: Oct. 24, 1980

[30] Foreign Application Priority Data

Oct. 26, 1979 [JP] Japan .................................. 54/137760

[51] Int. Cl.$^3$ ................................................ C23C 3/02
[52] U.S. Cl. .......................................... 148/6.3; 427/6; 427/350; 427/405; 427/419.2; 427/443.1; 427/437; 427/239; 106/1.23; 106/1.26; 376/416
[58] Field of Search ..................... 427/437, 443.1, 239, 427/5, 6, 350, 405, 419.2; 106/1.23, 1.26; 148/6.3

[56] References Cited

U.S. PATENT DOCUMENTS

| | | | |
|---|---|---|---|
| 3,377,174 | 4/1968 | Torigai et al. | 106/1.26 |
| 4,002,786 | 1/1977 | Hirohata et al. | 427/437 |
| 4,211,564 | 7/1980 | Oka | 427/437 |

FOREIGN PATENT DOCUMENTS

| | | |
|---|---|---|
| 40-1084 | 1/1965 | Japan . |
| 53-62737 | 6/1978 | Japan . |
| 53-62740 | 6/1978 | Japan . |
| 54-45495 | 4/1979 | Japan . |
| 1184277 | 3/1970 | United Kingdom ............... 106/1.26 |

*Primary Examiner*—Ralph S. Kendall
*Attorney, Agent, or Firm*—Craig and Antonelli

[57] ABSTRACT

A copper barrier type, nuclear fuel cladding is produced by forming an oxide layer on the inner wall surface of a tube of zirconium or zirconium alloy and then applying electroless copper plating to the oxide layer with a solution containing at least a copper salt, a complexing agent, a reducing agent, and 2,2'-dipyridyl, or further together with polyalkylene glycol as a plating solution. A good adhesiveness is obtained between the copper barrier layer and the oxide layer.

13 Claims, No Drawings

PROCESS FOR PRODUCING COPPER BARRIER TYPE, NUCLEAR FUEL CLADDING

BACKGROUND OF THE INVENTION

This invention relates to a process for producing a copper barrier type, nuclear fuel cladding, and more particularly to a process for producing a copper barrier nuclear fuel cladding by applying electroless copper plating to a zirconium oxide layer formed on the inner wall of a cladding of zirconium or zirconium alloy.

DESCRIPTION OF THE PRIOR ART

Heretofore, zirconium or zirconium alloy has been used as a material for nuclear fuel cladding, but this kind of cladding is liable to undergo stress corrosion due to an influence of nuclear reaction products when the load of a nuclear reactor is widely changed. That is, there has been such a restriction that the load cannot be changed so rapidly.

To improve the restriction, a process for forming a barrier layer of copper, nickel, or the like on the inner wall of a cladding has been proposed (Japanese Laid-open Patent Application Specifications Nos. 62737/78 and 62740/78). However, direct formation of a barrier layer of copper or nickel on the inner wall of a cladding of zirconium or zirconium alloy gives rise to formation of a very brittle layer of zirconium-copper alloy or zirconium-nickel alloy at the interface between the cladding and the barrier layer of copper or nickel during the operation, and thus there is a problem of peeling or damaging the barrier layer.

To improve the problem, processes for providing a zirconium oxide layer between the inner wall of zirconium or zirconium alloy cladding and the barrier layer have been studied and a process of oxidizing the inner wall of zirconium or zirconium alloy cladding, thereby forming a zirconium oxide layer, then depositing an electroless plating catalyst on the surface of the zirconium oxide layer, and applying an electroless copper plating to the surface of the zirconium oxide layer has been proposed as one of the processes (Japanese Laid-open Patent Application Specification No. 45495/79).

In the case of such copper barrier type, nuclear fuel cladding, a copper barrier layer with a smaller thickness cannot thoroughly fulfil the function as a barrier against the nuclear reaction products. On the other hand, a copper barrier layer with too large a thickness absorbs more neutrons, and the operating efficiency is thus lowered. For this reason, a copper barrier layer with a thickness of 5–10 $\mu$m is now recommended. However, the thickness of copper barrier layers with a good adhesiveness so far obtained is 5 $\mu$m as an upper limit.

SUMMARY OF THE INVENTION

An object of the present invention is to provide a process for producing a copper barrier type, nuclear fuel cladding free from the disadvantages of the prior art, where a copper barrier layer with a good adhesiveness is provided on a zirconium oxide layer formed on the inner wall of zirconium or zirconium alloy cladding.

The present invention provides a process for producing a copper barrier type, nuclear fuel cladding which comprises oxidizing an inner wall surface of zirconium or zirconium alloy cladding, thereby forming an oxide layer, and electrolessly copper plating the oxide layer, characterized in that the electroless copper plating is carried out with an electroless copper plating solution containing at least 2,2'-dipyridyl.

According to the experiences of the present inventors, the adhesiveness of a copper layer to a substrate plate generally depends upon the kind and roughness of a given substrate plate, and not upon the kind of an electroless copper plating solution, when a substrate plate, such as an insulating substrate plate, etc. is electrolessly plated. In the production of a copper barrier type nuclear fuel cladding by forming an oxide layer on the inner wall surface of a zirconium alloy cladding for nuclear fuel and electrolessly copper plating the oxide layer, the present inventors found that the adhesiveness of a copper barrier layer depends not only upon the roughness of a given substrate, but also upon the kind of an electroless copper plating solution, differently from the afore-mentioned general phenomena.

As a result of further study, the present inventors have found that a good adhesiveness can be obtained between a substrate and a copper barrier by using an electroless copper plating solution containing 2,2'-pyridyl as an additive.

According to the tests up to a thickness of 20 $\mu$m, the adhesiveness is not dependent upon the thickness of barrier layer, and is not substantially changed. For example, a good adhesiveness can be obtained even with a copper barrier layer having a thickness of 10 $\mu$m.

It is well known to use 2,2'-dipyridyl as a stabilizer (an additive for maintaining the properties of a plating solution constant) in an electroless copper plating solution (Japanese Patent Publication No. 1084/65), but it is the effect attained for the first time by the present invention that the adhesiveness of a copper barrier layer can be improved by using 2,2'-dipyridyl in an electroless copper plating solution for producing a copper barrier type, nuclear fuel cladding. Furthermore, the present inventors have found that no good adhesiveness cannot be obtained by single addition of other stabilizers to an electroless copper plating solution, and rather the adhesiveness is dependent upon the thickness of the layer, that is, the adhesiveness is lowered with increasing thickness of the layer. The present invention has been accomplished on the basis of these findings.

An electroless copper plating solution to be used in the present invention contains at least 2,2'-dipyridyl as an additive in addition to the basic components generally employed, such as a copper salt, a complexing agent for the copper salt, a reducing agent, a pH-controlling agent, etc.

As an additive to be used together with 2,2'-dipyridyl, polyalkyleneglycol is particularly preferable. Swelling of the resulting copper barrier layer can be prevented and the surface of the barrier layer can be made smooth by applying an electroless copper plating solution containing the polyalkyleneglycol. Thus, it is possible to prevent cracking or peeling of the copper barrier layer with more certainty.

DETAILED DESCRIPTION OF THE PREFERRED EMBODIMENTS

As a nuclear fuel cladding of zirconium or zirconium alloy as a starting material for carrying out the present invention, an alloy comprising 98.29% by weight of zirconium (Zr), 1.42% by weight of tin (Sn), 0.10% by weight of chromium (Cr), 0.14% by weight of iron (Fe), and 0.05% by weight of nickel (Ni), heated at 577° C. for 2.5 hours as the ultimate heat treatment and annealed, is used.

In order to improve the adhesiveness of a copper barrier layer to be ultimately formed, the inner wall surface of cladding is roughned before the oxidation of the inner wall surface of cladding. A physical method and a chemical method are available for roughening the inner surface of cladding. For uniform roughening of the inner wall surface of cladding as long as 4 m, a chemical method is preferable. For example, the inner wall surface of cladding can be roughened by contacting it with a roughening solution, for example, a mixed solution of ammonium hydrogen fluoride and sulfuric acid, or a mixed solution of ammonium hydrogen fluoride and hydrofluoric acid.

Then, it is desirable to wash the roughened surface by ultrasonic washing, etc. In most cases, there are smuts (scales) on the roughened surface. When electroless copper plating is carried out without removing the smuts on the roughened surface, a copper barrier layer is liable to swell later.

An oxide layer is then formed by oxidizing the roughened surface, that is, by exposing the roughened surface to steam at a temperature of about 400° C. for 10 to 20 hours in an autoclave. The oxidation can be carried out, if necessary, in an atmosphere containing oxygen. An appropriate thickness of the oxide layer is about 1 $\mu$m. Not only alloying by direct contact of zirconium alloy with a copper film, but also embittlement of the intersurface can be prevented by forming the oxide layer.

As a catalyst solution for electroless copper plating, a solution containing a noble metal salt is applied to the surface of the oxide layer, for example, by treating the surface with a solution containing stannous chloride and then with a solution containing palladium chloride, or by treating the surface with an acidic solution containing stannous chloride and palladium chloride.

For an electroless copper plating solution, generally copper sulfate can be used as a copper salt; Rochelle salt, N-hydroxyethylethylenediamine triacetic acid, ethylenediaminetetraacetic acid (EDTA), etc., can be used as a complexing agent for the copper salt; formalin can be used as a reducing agent; sodium hydroxide, etc. can be used as a pH-controlling agent. It is desirable in view of the stability and workability of an electroless copper plating solution that amounts of basic components of an electroless copper plating solution are in the following ranges:

| | |
|---|---|
| Copper salt (as $CuSO_4 \cdot 5H_2O$) | 3-30 g/l |
| Complexing agent (as EDTA) | 9-90 g/l |
| Reducing agent (as 37% HCHO) | 1-10 g/l |
| pH-Controlling agent (as NaOH) | To make pH 12-13 at 20° C. |

Electroless copper plating is carried out by dipping the cladding resulting from the aforementioned treatment into an electroless copper plating solution of the above-mentioned composition containing a predetermined amount of 2,2'-dipyridyl, if necessary, together with another additive, treating the cladding at a temperature of 40° to 60° C. for several hours, and then slowly cooling the cladding, whereby a copper barrier layer can be formed on the oxide layer. It is also effective to recyclically pass the electroless copper plating solution through the cladding.

The amount of 2,2'-dipyridyl to be added as the additive depends upon the plating temperature and the presence or absence of another additive. In the case of single use of 2,2'-dipyridyl as the additive, that is, when no other additive, for example, polyethyleneglycol is used, an appropriate amount of 2,2'-dipyridyl is about 3 to 1,000 mg/l. In the case of less than about 2.5 mg/l, the effect is very low, though dependent upon other plating solution conditions.

2,2'-dipyridyl has a good effect upon the adhesiveness, but has a property of retarding the plating speed. Such property is more remarkable with increasing amount of 2,2'-dipyridyl added. For example, a copper barrier layer with a thickness of only about 0.1 $\mu$m is obtained in one hour at a concentration of more than about 1,000 mg/l, and it takes about 100 hours to obtain a copper barrier layer with a thickness of 10 $\mu$m. This is not practical. In view of the economy of the amount of the additive to be added and the plating time, the desirable concentration is not more than about 100 mg/l. At a concentration of 100 mg/l, a copper barrier layer with a thickness of about 1 $\mu$m can be formed in one hour with the electroless copper plating solution at 60° C.

In the present invention, a good effect can be obtained by single addition of 2,2'-dipyridyl, but it is possible to use other additives, for example, the so-called stabilizer for a plating solution such as thiourea, 2-mercaptobenzothiazole, sodium bisulfite, rhodanin, sodium cyanide, o-phenanthroline, etc. and polyalkyleneglycol, etc. at the same time in order to increase the stability of the plating solution and improve the mechanical properties of a copper barrier layer. The amount of these additives to be added depends upon the plating speed, stability of the plating solution and the required mechanical properties of the plating layer. Particularly when 2,2'-dipyridyl is used together with a polyalkyleneglycol represented by polyethyleneglycol (PEG), the resulting copper barrier layer has no swelling and has a smooth surface. That is, cracking or peeling of the copper barrier layer can be prevented with more certainty, and also corrosion and damage of nuclear fuel cladding can be prevented. So far proposed electroless copper plating layer has so many small swellings, which can be observable by a microscope with a magnification of about 30. The swelling-preventing effect by the addition of PEG depends upon the plating temperature, molecular weight of PEG, and the amount of 2,2'-dipyridyl added, but can be obtained at a PEG concentration of about 0.5 g/l or more. Too high a PEG concentration lowers the plating speed, and thus an appropriate PEG concentration is not more than about 5 g/l. It is appropriate to use PEG with an average molecular weight of 200 to 10,000, and readily available PEG with an average molecular weight of 600 is preferable to use. PEG with an average molecular weight of more than 10,000 is less soluble. When PEG is used at the same time, a concentration of 2,2'-dipyridyl is more than about 30 mg/l in the case of using PEG at the same time, the swelling-preventing effect is lowered. When the concentration is less than about 2.5 mg/l, pits (concave parts) are formed on the surface of copper barrier layer. For this reason, the most appropriate electroless plating solution for obtaining an increase in adhesiveness and swelling-preventing effect contains about 2.5 to about 30 mg/l of 2,2'-dipyridyl and about 0.5 to about 5 g/l of PEG with an average molecular weight of 600. A copper barrier type, nuclear fuel cladding having a copper plating barrier layer with a good adhesiveness can be produced by the foregoing treatments.

In order to remove water and gas components from the copper plating barrier layer after the electroless copper plating, it is desirable to dry or heat the resulting cladding. An appropriate condition for it is about 200° C. in vacuum in order to avoid oxidation of the copper barrier layer. Generation of small swellings can be prevented with certainty by the aforementioned degasifying treatment. The degasifying treatment under a subatmospheric pressure never damages the copper barrier layer.

The present invention will be described more specifically below, referring to example, but will not be restricted thereby.

EXAMPLE AND COMPARATIVE EXAMPLE

The inner wall of tube made of the above-mentioned zirconium alloy, 12.3 mm in outer diameter, 10.6 mm in inner diameter and 4 m long, was washed with a solution of hydrofluoric acid and nitric acid, mixed at a ratio by volume of 1:1. After water washing, the tube was washed with an aqueous sodium hydroxide solution (500 g/l) and further washed with water. Then, the tube was defatted with trichlene, and the inner wall surface was roughened by circulating a roughening solution containing 15 g/l of ammonium hydrogen fluoride and 0.9 g/l of sulfuric acid through the tube at a solution temperature of 18°±2° C. and a flow rate of 1 l/min. for two minutes. Then, the tube was thoroughly washed with water and then with deionized water. Then, ultrasonic wave of about 40,000 Hz was applied to the tube for 5 minutes to remove the smuts from the inner wall of the tube.

Then, the tube was dried with air, and treated in a steam atmosphere at 395° C. and 5 atm for 20 hours in an autoclave to form zirconium oxide layer at both inner wall and outside surface of the tube. The thickness of the oxide layer on the inner wall was about 1 μm. After slow cooling, the tube was taken out of the autoclave, and cut to about 100 mm-long pieces.

The cut tubes were dipped in a surfactant (Conditioner 1160 made by Shipley Co., Inc. USA) for 5 minutes to improve the wettability of the inner walls of the tubes. Then, the tubes were dipped in 18% hydrochloric acid after washing with water, and then in a catalyst solution consisting of a hydrochloric acid-acidified aqueous solution containing palladium chloride and stannous chloride (Sensitizer HS 101B, made by Hitachi Chemical Co., Ltd.) for 5 minutes. After washing with water, the tubes were dipped in an aqueous solution containing hydrochloric acid and oxalic acid, and then washed with water. A catalyst for electroless copper plating was deposited on the roughened surfaces of the tubes through the foregoing process.

The tubes thus treated were immediately dipped into electroless copper plating solutions having the following composition as a base and further containing additives shown in Table 3 (where other additives than 2,2'-pyridyl are also shown together for comparison) and subjected to electroless copper plating so that the resulting copper barrier layers can have thicknesses of 5 μm and 10 μm.

| Copper sulfate pentahydrate | 10 g |
| Disodium ethylenediaminetetraacetate | 25 g |
| Formalin (37%) | 3 ml |
| Sodium hydroxide | 12 g |
| Water to make total volume 1 l | |

After electroless copper plating was conducted to the predetermined thickness under the conditions shown in the following Tables, the tubes were washed with water and dried. Then, the tubes were treated in vacuum at 200° C. for 3 hours, and then slowly cooled to complete copper barrier type nuclear fuel claddings.

The claddings thus prepared were cut each to 40 mm, and further divided to halves along the axial line of the claddings. Then, each of the cut halves was placed on a support base with a gap which was 10 mm long and 20 mm deep, with the open side of the cut half down, so that the cut half could cross over the gap at a right angle. Then, the cut half was pressed down at a position above the center of the gap at a rate of 30 mm/min. to get bending only by a stroke corresponding to the depth of 20 mm. Adhesiveness of the copper barrier layer to the zirconium oxide layer as the underlayer was investigated in this manner. The results are shown in the following Tables, where evaluation was made by visual observation, and double circle marks " " show no observable surface change at all or no peeling of copper barrier layer at all though there is cracking between the substrate zirconium alloy and the copper barrier layer, single circle marks "◉" show occurrence of peeling at cracked parts observable only by observation through a microscope having a magnification of 20, triangle marks "Δ" show partial peeling of copper barrier layer around the cracked parts or the copper barrier layer in a nearly peelable state, and cross marks "x" show complete peeling of copper barrier layer around the cracked parts.

Table 1 shows relationships between the amount of 2,2'-dipyridyl and adhesiveness, where the plating solution was kept at 60° C. It is obvious from Table 1 that the desirable amount of 2,2'-dipyridyl to be added is at least about 2.5 ml/l. As described before, the plating time is prolonged with increasing amount of 2,2'-dipyridyl to be added. For example, about 1 μm/hr at 100 mg/l of 2,2'-dipyridyl, and about 0.1 μm/hr at 1,000 mg/l thereof.

TABLE 1

| Run No. | 2,2'-di-pyridyl added (mg/l) | Adhesiveness 5 μm thick | 7 μm thick | 10 μm thick |
|---|---|---|---|---|
| 1 | 0 | ◉ | ○ | x |
| 2 | 2 | ◉ | ○ | Δ |
| 3 | 2.5 | ◉ | ◉ | ○ |
| 4 | 3 | ◉ | ◉ | ○ |
| 5 | 5 | ◉ | ◉ | ◉ |
| 6 | 30 | ◉ | ◉ | ◉ |
| 7 | 100 | ◉ | ◉ | ◉ |
| 8 | 300 | ◉ | ◉ | ◉ |
| 9 | 1000 | ◉ | ◉ | ◉ |

Table 2 shows relationships between the plating temperature and adhesiveness while keeping the amount of 2,2'-dipyridyl constant at 30 mg/l. As is obvious from Table 2, a good adhesiveness can be obtained in a practical temperature range such as about 40° to about 75° C.

TABLE 2

| Run No. | Plating temp. (°C.) | Adhesiveness 5 μm thick | 7 μm thick | 10 μm thick |
|---|---|---|---|---|
| 6 | 60 | ◉ | ◉ | ◉ |
| 10 | 40 | ◉ | ◉ | ◉ |
| 11 | 75 | ◉ | ◉ | ◉ |

Table 3 shows results obtained when 2,2'-dipyridyl was used together with other additives and when other additives were used in place of 2,2'-dipyridyl. As is obvious from Table 3, 2,2'-dipyridyl is most distinguished in the improvement of adhesiveness, as compared with the results of single addition of the additives. PEG having an average molecular weight of 600 was used.

TABLE 3

| Run No. | Additive | Amount added (mg/l) | Plating temp. (°C.) | Adhesiveness 5 μm thick | Adhesiveness 10 μm thick |
|---|---|---|---|---|---|
| 12 | 2,2'-dipyridyl PEG | 30 20 | 72 | ⊚ | ⊚ |
| 13 | 2,2'-dipyridyl thiourea | 30 0.3 | 60 | ⊚ | ⊚ |
| 14 | 2,2'-dipyridyl sodium bisulfite | 30 1000 | 60 | ⊚ | ⊚ |
| 15 | 2,2'-dipyridyl sodium cyanide | 30 2 | 60 | ⊚ | ⊚ |
| 16 | 2,2'-dipyridyl 2-mercaptobenzothiazole | 10 0.3 | 60 | ⊚ | ⊚ |
| 17 | 2,2'-dipyridyl rhodanine | 10 5 | 60 | ⊚ | ⊚ |
| 18 | 2,2'-dipyridyl γ-phenanthnoline | 10 1 | 60 | ⊚ | ⊚ |
| 19 | PEG | 20 | 55 | ⊚ | Δ |
| 20 | 2,2'-biquinoline | 50 | 40 | ⊚ | x |
| 21 | thiourea | 0.3 | 40 | ⊚ | Δ |
| 22 | sodium bisulfite | 1000 | 40 | ⊚ | Δ |
| 23 | sodium cyanide | 2 | 40 | ⊚ | Δ |
| 24 | 2-mercaptobenzothiazole | 0.3 | 40 | ⊚ | Δ |
| 25 | rhodanine | 5 | 40 | ○ | x |
| 26 | O-phenanthroline | 5 | 60 | ○ | x |

Table 4 shows results of observation of swelling. Swelling was observed by a microscope having a magnification of 30. Run Nos. 12 and 27–31 show results of electroless plating using electroless copper plating solutions containing 2,2'-dipyridyl and PEG, and Run Nos. 32–40 show results of electroless plating using electroless copper plating solutions containing no 2,2'-pyridyl but PEG as a single additive, where other Run Nos. show reference examples. PEG having an average molecular weight of 600 was used unless otherwise specified. Figure in parentheses in the column for "PEG added" shows a molecular weight. Microscopic observation of Run Nos. 21–26 shown in Table 3 revealed that many swellings were observed in every run.

TABLE 4

| Run No. | 2,2'-dipyridyl added (mg/l) | PEG added (g/l) | Plating temp. | Adhesiveness 10 μm thick | Swelling evaluation |
|---|---|---|---|---|---|
| 12 | 30 | 20 | 72 | ⊚ | None |
| 27 | 2.5 | 0.5 | 57 | ⊚ | None |
| 28 | 5 | 1 | 57 | ⊚ | None |
| 29 | 2.5 | 1.5 | 57 | ⊚ | None |
| 30 | 5 | 5 | 57 | ⊚ | None |
| 31 | 2.5 | 0.2 | 60 | ○ | Swollen |
| 32 | 0 | 0.2 | 55 | Δ | Swollen |
| 33 | 0 | 0.5 | 55 | Δ | very small swelling |
| 34 | 0 | 3 | 55 | Δ | None |
| 35 | 0 | 100 | 55 | Δ | None |
| 36 | 0 | 20(200) | 60 | Δ | very small swelling |
| 37 | 0 | 20 | 60 | Δ | None |
| 38 | 0 | 20(2,000) | 60 | Δ | None |
| 39 | 0 | 3(6,000) | 60 | Δ | None |
| 40 | 0 | 3(10,000) | 60 | Δ | None |

TABLE 4-continued

| Run No. | 2,2'-dipyridyl added (mg/l) | PEG added (g/l) | Plating temp. | Adhesiveness 10 μm thick | Swelling evaluation |
|---|---|---|---|---|---|
| 6 | 30 | 0 | 60 | ⊚ | Swollen |
| 8 | 300 | 0 | 60 | ⊚ | Many swellings |

Excess test pieces other than used in the foregoing adhesiveness test were left standing in the atmosphere for about 2 months and their surfaces were observed.

No change was observed at all in all of the test pieces.

What is claimed is:

1. In a process for producing a copper barrier type, nuclear fuel cladding which comprises forming an oxide layer on the inner wall surface of a tube of zirconium or zirconium alloy, and then applying electroless copper plating to the oxide layer with a plating solution containing at least a copper salt, a complexing agent, and a reducing agent, the improvement wherein the plating solution also contains 2,2'-dipyridyl at a concentration of at least about 2.5 mg/l and the copper plating is applied to a thickness greater than 5 μm.

2. A process according to claim 1, wherein the 2,2'-dipyridyl is contained at a concentration of not more than about 100 mg/l.

3. A process according to claim 1, wherein the tube with the oxide layer is dipped in the plating solution, subjected to electroless plating at a temperature of 40° to 60° C., and then slowly cooled.

4. A process according to claim 1, wherein the plated tube is heated in vacuum, thereby effecting degasifying treatment.

5. A process according to claim 1, wherein the plating solution contains a stabilizer for plating solution.

6. In a process for producing a copper barrier type, nuclear fuel cladding, which comprises forming an oxide layer on the inner wall surface of a tube of zirconium or zirconium alloy, and then applying electroless copper plating to the oxide layer with a solution containing at least a copper salt, a complexing agent, and a reducing agent, the improvement wherein the plating solution also contains 2,2'-dipyridyl at a concentration of at least about 2.5 mg/l and polyalkylene-glycol at a concentration of at least 0.5 g/l and the copper plating is applied to a thickness greater than 5 μm.

7. A process according to claim 6, wherein the polyalkyleneglycol is polyethyleneglycol.

8. A process according to claim 7, wherein the 2,2'-dipyridyl is contained at a concentration of about 2.5 to 30 mg/l, and the polyethyleneglycol at a concentration of about 0.5 to 5 g/l.

9. A process according to claim 6, wherein the polyethyleneglycol has an average molecular weight of 200 to 10,000.

10. A process according to claim 6, wherein the 2,2'-dipyridyl is contained at a concentration of not more than about 30 mg/l.

11. A process according to claim 6, wherein the tube with the oxide layer is dipped in the plating solution, subjected to the electroless plating at a temperature of 40° to 60° C., and then slowly cooled.

12. A process according to claim 6, wherein the plated tube is heated in vacuum, thereby effecting degasifying treatment.

13. A process according to claim 1 or 6, wherein the copper plating is applied to a thickness greater than 5 μm to 10 μm.

* * * * *